US010762294B2

(12) United States Patent
Juton et al.

(10) Patent No.: US 10,762,294 B2
(45) Date of Patent: Sep. 1, 2020

(54) UNIVERSALLY UNIQUE RESOURCES WITH NO DICTIONARY MANAGEMENT

(71) Applicant: Dassault Systèmes Americas Corp., Waltham, MA (US)

(72) Inventors: Alexandre Juton, Brookline, MA (US); Pierre-Severin Lanfranchi, Winchester, MA (US); David Edward Tewksbary, Bolton, MA (US)

(73) Assignee: DASSAULT SYSTÈMES AMERICAS CORP., Waltham, MA (US)

( * ) Notice: Subject to any disclaimer, the term of this patent is extended or adjusted under 35 U.S.C. 154(b) by 185 days.

(21) Appl. No.: 15/858,306

(22) Filed: Dec. 29, 2017

(65) Prior Publication Data

US 2019/0205380 A1     Jul. 4, 2019

(51) Int. Cl.
*G06F 7/00* (2006.01)
*G06F 16/00* (2019.01)
*G06F 40/242* (2020.01)
*G06F 16/22* (2019.01)
*G06F 16/31* (2019.01)

(52) U.S. Cl.
CPC ........ *G06F 40/242* (2020.01); *G06F 16/2237* (2019.01); *G06F 16/2255* (2019.01); *G06F 16/325* (2019.01)

(58) Field of Classification Search
None
See application file for complete search history.

(56) References Cited

U.S. PATENT DOCUMENTS

| 6,041,345 | A | * | 3/2000 | Levi | H04L 29/06 375/E7.267 |
| 2006/0235823 | A1 | | 10/2006 | Chong et al. | |
| 2011/0225167 | A1 | | 9/2011 | Bhattacharjee et al. | |
| 2012/0275642 | A1 | * | 11/2012 | Aller | H04N 1/32203 382/100 |
| 2013/0262703 | A1 | * | 10/2013 | Dong | H04L 47/38 709/247 |

(Continued)

OTHER PUBLICATIONS

Mavlyutov et al., "A Comparison of Data Structures to Manage URIs on the Web of Data", eXascale Infolab, University of Fribourg—Switzerland, 15 pages, 2015.

(Continued)

*Primary Examiner* — Tuan A Pham
(74) *Attorney, Agent, or Firm* — Hamilton, Brook, Smith & Reynolds, P.C.

(57) ABSTRACT

The databases and methods disclosed herein reduce costly dictionary access (writes and reads) by storing data directly in an index (e.g., storing literal values or taking advantage of Universally Unique Identifiers (UUIDs)), thereby saving time and memory. One example embodiment is a database that includes a dictionary and an index. The dictionary stores associations between keys and data. Each entry in the index includes a plurality of values corresponding to data. A value of the index includes either (i) a direct representation of corresponding data for certain data types, or (ii) a hash of the corresponding data for other data types. The hash is used in the dictionary as a key associated with the corresponding data.

14 Claims, 8 Drawing Sheets

(56) References Cited

U.S. PATENT DOCUMENTS

| | | | | |
|---|---|---|---|---|
| 2014/0156587 A1* | 6/2014 | Momtchev | ............ | G06F 16/283 |
| | | | | 707/600 |
| 2014/0304275 A1* | 10/2014 | Baskett | ................ | G06F 16/221 |
| | | | | 707/747 |
| 2014/0365500 A1* | 12/2014 | Futamura | ............ | G06F 16/2255 |
| | | | | 707/743 |
| 2016/0105761 A1* | 4/2016 | Polo | .................... | H04W 56/001 |
| | | | | 455/41.2 |
| 2016/0203180 A1* | 7/2016 | Hanai | ................ | G06F 9/30043 |
| | | | | 707/758 |
| 2017/0222920 A1* | 8/2017 | Thubert | .................. | H04L 45/70 |
| 2017/0347229 A1* | 11/2017 | Kwon | .................... | H04W 4/80 |
| 2017/0353302 A1* | 12/2017 | Fernandez | ............ | H04L 9/0662 |

OTHER PUBLICATIONS

Cheng, et al., "Efficient Parallel Dictionary Encoding for RDF Data", Proc. 17th International Workshop on the Web and Databases (WebDB'14), Jun. 2014, 6 pages.

Martinez-Prieto, et al. "Practical Compressed String Dictionaries", Information Systems, vol. 56, Mar. 2016, pp. 73-108.

Extended European Search Report issued for EP Application No. 18210734.2, dated Mar. 7, 2019.

Faye, et al., "A Survey of RDF Storage Approaches," ARIMA Journal, vol. 15 (2012), pp. 11-35; Accepted Feb. 7, 2012.

Harris, et al., "3store: Efficient bulk RDF storage", Internet citation, Oct. 20, 2003.

* cited by examiner

UNIVERSALLY UNIQUE RESOURCES WITH NO DICTIONARY MANAGEMENT

BACKGROUND

Eventual consistency is a model used in distributed computing with the goal that all individual accesses to an item will eventually return the same value. Systems on the Semantic Web that are eventually consistent are often referred to as BASE (Basically Available, Soft state, Eventual consistency). Resource Description Framework (RDF) is an example standard for data interchange on the Web. RDF uses Universal Resource Identifiers (URIs) to describe relationships between things as a subject, predicate, and object (referred to as a "triple"). A URI is a string of characters used to identify a resource. One example of a URI is a Uniform Resource Locator (URL), frequently referred to as a "web address." RDF can be represented as a directed, labeled graph, where nodes represent Web resources and edges between the nodes represent relationships between the resources.

Applications allowing the production of a very large amount of data can benefit from using an RDF dataset. In such cases, the production of very large numbers of URIs must be supported. A dictionary can be used to provide indexes to RDF triples storage to help optimize the persistence of vastly redundant information. The dictionary and index essentially offer three operations: (1) Insert—attribute an index to a RDF node and store its value in the dictionary, (2) Locate—provide the index associated with a RDF node, and (3) Extract—provide, from the dictionary, the value associated with an index. Locate and Extract operations can be costly as the dictionary grows, as they require accessing the latest updates to the dictionary as a whole from distant sites in order to distribute accurate indexes. The Insert operation can be problematic in the context of a decentralized and distributed dictionary, as two different sites may try to insert the same resource simultaneously.

SUMMARY

Universally Unique Identifiers (UUIDs) can be used in RDF datasets to attribute data identifiers with almost no risk of collision. A UUID, represented as a string, may be more compact than many traditional URIs, being 36 bytes (i.e., two alphanumeric characters per byte in hexadecimal format and four dashes according to standard UUID textual form), but manipulating the UUID as a string is suboptimal because its natural binary representation is only 16 bytes (128 bits). Handling a large amount of UUID-based URIs using a string dictionary is waste of processor cycles and memory, and misses the benefit of a feature of UUIDs: two distinct sites generating the same UUIDs is an extremely unlikely event. So unlikely that it can be taken as assumption in building a decentralized system, with no need for cross-verification.

The databases and methods disclosed herein can take advantage of this to reduce costly dictionary access (writes and reads), saving time and memory. One example embodiment is a database that includes a dictionary and an index. The dictionary stores associations between keys and data. Each entry in the index includes a plurality of values corresponding to data. A value of the index includes either (i) a direct representation of corresponding data for certain data types, or (ii) a hash of the corresponding data for other data types. The hash is used in the dictionary as a key associated with the corresponding data.

Another example embodiment is a computer implemented method of storing data in a database, where the database includes an index and a dictionary. The example method includes storing, in the dictionary, associations between keys and data. The method further includes storing, in the index, indices including a plurality of values corresponding to data. A value of the index includes either (i) a direct representation of corresponding data for certain data types, or (ii) a hash of the corresponding data for other data types. The hash is used in the dictionary as a key associated with the corresponding data.

Another example embodiment is a method of storing and retrieving data in computer memory. The example method includes configuring the memory according to an index and a dictionary. Each entry in the index includes a plurality of values corresponding to data. The dictionary stores associations between keys and data. Each value of the index includes either (i) a direct representation of corresponding data for certain data types, or (ii) a hash of the corresponding data for other data types. The hash is used in the dictionary as a key associated with the corresponding data.

In some embodiments, the database can be a Resource Description Framework database, and the plurality of values of the index can include three values corresponding to a subject, a predicate, and an object. In some embodiments, a value of the index can include a direct representation of corresponding data for any data of type: integer, double, float, string of eight characters or less, or universally unique identifier.

In some embodiments a first number of bits of an index value can represent a category of data represented by the value. The category of data represented by the first number of bits of the index value can be a literal value category, in which case a second number of bits of the index value can represent a data type of the literal value. The remaining bits of the index value can store the literal value of the data. Index values can be 128 bits, and the first number of bits (representing the category of data), can be two bits. In the case of a literal value category, the second number of bits (representing the data type) can be 62 bits. In cases other than literal values, the remaining bits of the index value (other than the first number of bits) can store the data. In some cases, the data stored in the remaining bits of the index value can be a universally unique identifier, and in other cases, the remaining bits of the index value can store a hash of the data.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

A naming scheme is needed to identify data in a dataset. UUIDs are commonly used to attribute data identifiers with almost no risk of collision. A UUID is a 128-bit number used to identify information in computer systems. When generated according to standard methods, UUIDs are unique without depending on centralized management or coordination between parties generating UUIDs. The probability that a UUID will be a duplicated is negligible.

Figure 1:
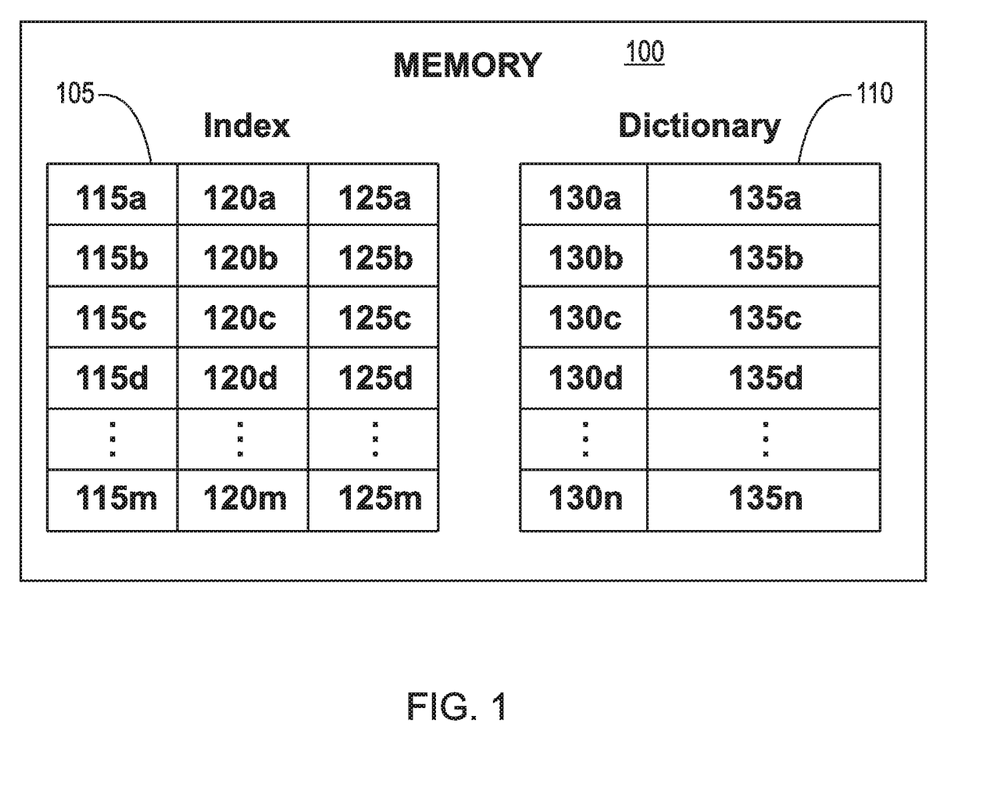
FIG. 1 is a block diagram illustrating a dictionary and index in memory, according to an example embodiment.

FIG. 1 is a block diagram illustrating a dictionary 110 and index 105 in memory 100, according to an example embodiment. The dictionary stores associations between keys 130a-n and data 135a-n. Each entry (a row of the index 105) in the index 105 includes a plurality of values 115a-m, 120a-m, and 125a-m corresponding to data. A value of the index 105 includes either (i) a direct representation of corresponding data for certain data types, or (ii) a hash of the corresponding data for other data types. The hash is used in the dictionary 110 as a key (one of 130a-n) associated with the corresponding data.

In a particular embodiment, the dictionary 110 can use 128-bit hash keys as indexes to any information (e.g., RDF node). Literal values of certain data types (e.g., integers, double precision floating-point numbers, dates and times, or short strings) can fit into a 64-bit half key. Two bits of the 128-bit value can be reserved for classification of the data, and the remaining 62-bits can be used to encode the data type. Similarly, UUIDs can be encoded in the 128-bit value using the full length of the 128-bit hash key, two reserved bits making it possible to distinguish the case of a UUID.

Figure 2A:
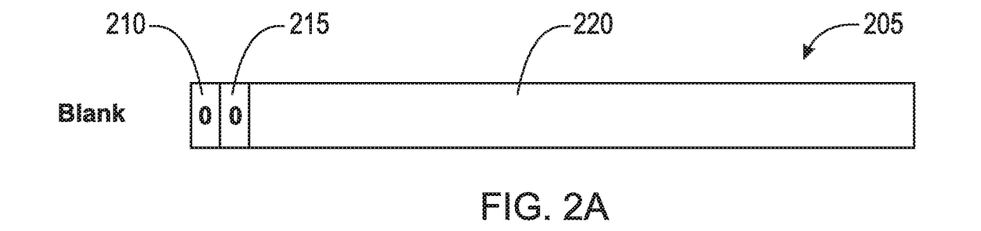
FIGS. 2A-D are a block diagrams illustrating examples of index values, according to an example embodiment.

FIGS. 2A-D are a block diagrams illustrating examples of index values 205, 225, 250, and 270, according to an example embodiment. FIG. 2A illustrates an example index value 205 representing a blank node. Two bits of the index value 205 can be used to indicate a blank node. In the case of FIG. 2A, the first two bits 210, 215 of the value 205 are used, and the bit values indicating a blank node can be, for example, "00", as shown. It should be appreciated that a different combination of bit values may be used.

Figure 2B:
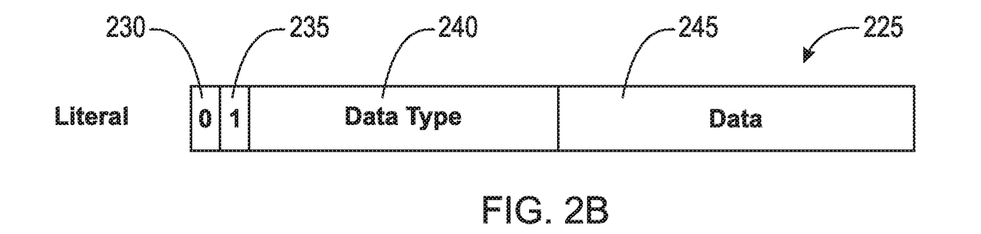

FIG. 2B illustrates an example index value 225 representing data in literal form. Two bits of the index value 225 can be used to indicate that the literal value of the data is stored in the index. In the case of FIG. 2B, the first two bits 230, 235 of the value 225 are used, and the bit values indicating a literal category can be, for example, "01", as shown. It should be appreciated that a different combination of bit values may be used. A number of bits 240 can be used indicate the type of data (e.g., integer, double precision floating-point number, date, time, or short string). The remaining bits 245 can be used to store the literal value of the data. For example, in the case of FIG. 2B, 62 bits can be used to designate the data type, and 64 bits can be used to store the literal value of the data.

Figure 2C:
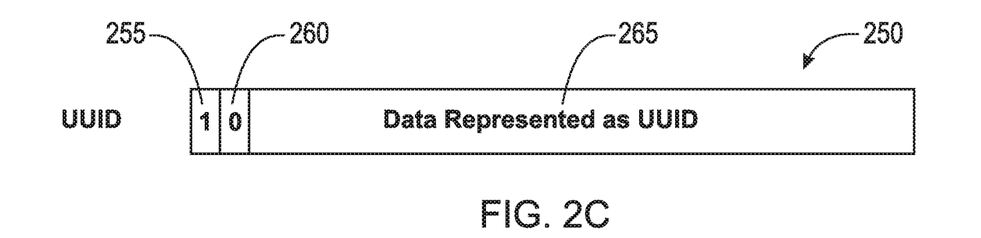

FIG. 2C illustrates an example index value 250 representing data as a UUID. Two bits of the index value 250 can be used to indicate that the data is stored in the index as a UUID. In the case of FIG. 2C, the first two bits 255, 260 of the value 250 are used, and the bit values indicating a UUID category can be, for example, "10", as shown. It should be appreciated that a different combination of bit values may be used. The remaining bits 265 can be used to store the data in UUID format.

Figure 2D:
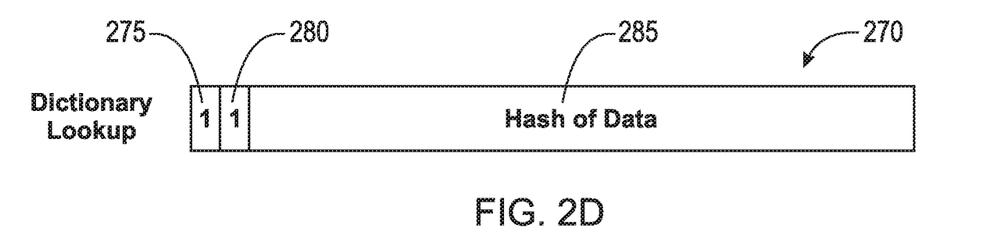

FIG. 2D illustrates an example index value 270 that is a hash key used to look-up data in a dictionary (e.g., 110 of FIG. 1). Two bits of the index value 270 can be used to indicate that the data is stored in the dictionary. In the case of FIG. 2D, the first two bits 275, 280 of the value 270 are used, and the bit values indicating that the data is stored in the dictionary can be, for example, "11", as shown. It should be appreciated that a different combination of bit values may be used. The remaining bits 285 can be used to store the hash key.

Figure 3:
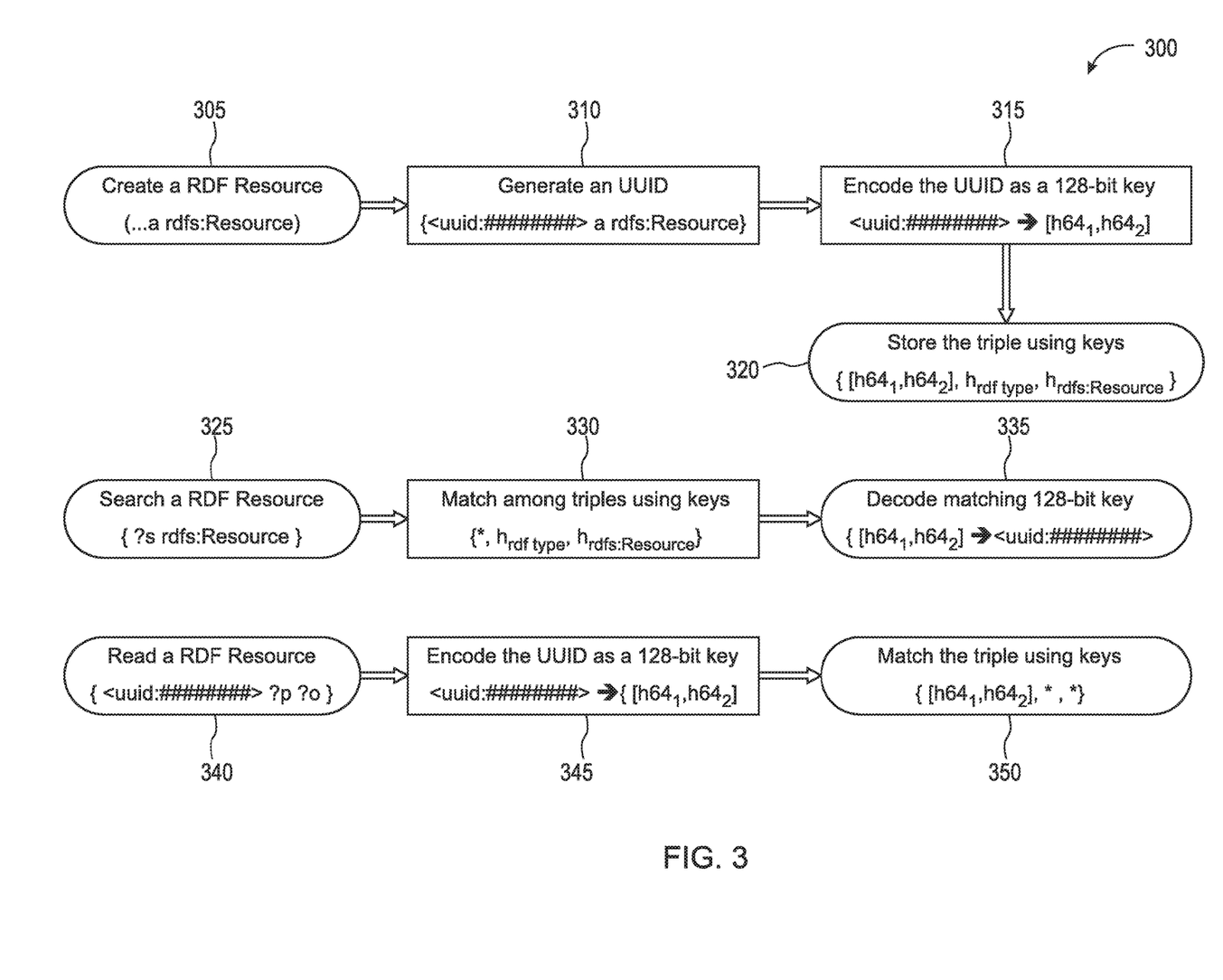
FIG. 3 is a flow diagram illustrating example operations on a database, according to an example embodiment.

FIG. 3 is a flow diagram illustrating example operations on a database, according to an example embodiment. Dictionaries of the databases and methods disclosed herein can be considered as inverse hash tables that can compute a value given the hash key to perform an Extract operation. The Insert and Locate operations, on the other hand, operate at constant time, and do not require any synchronization between distant sites. In the case of an RDF dictionary, the dictionary is essentially an append-only BASE database, with relaxed transactional requirements. Use of the disclosed hash keys enables an Insert operation to be performed by writing to the dictionary without reading from the dictionary. By design, there is no need to check if the index to be attributed is already used in the dictionary. In addition, a Locate operation can be performed by "reading without a read" as the key can be inferred from the value itself if the correct hash algorithm is known. With reference to FIG. 3, an RDF resource can be created 305 by generating 310 a UUID based on the resource and encoding 315 the UUID as a 128-bit key. An RDF triple can be stored 320 using generated keys. An RDF resource can be searched 325 by searching 330 the triples based on keys, and decoding 335 a matching 128-bit key. It is preferable to obtain a resource by decoding the key without reference to the dictionary, if possible. An RDF resource can be read 340 by encoding a UUID as a 128-bit key and matching 350 a tripe using they keys. For a complete decentralized dictionary, it is beneficial to avoid storage in the dictionary when possible, which can be accomplished using the databases and methods disclosed here by in-place encoding of data in hash keys. Dictionary access can be avoided for most literal values, for all UUID-based generated resources, and for anonymous nodes (using UUIDs). Given a large enough dataset, almost all nodes (by several orders of magnitude) do not require dictionary management.

Figure 4:
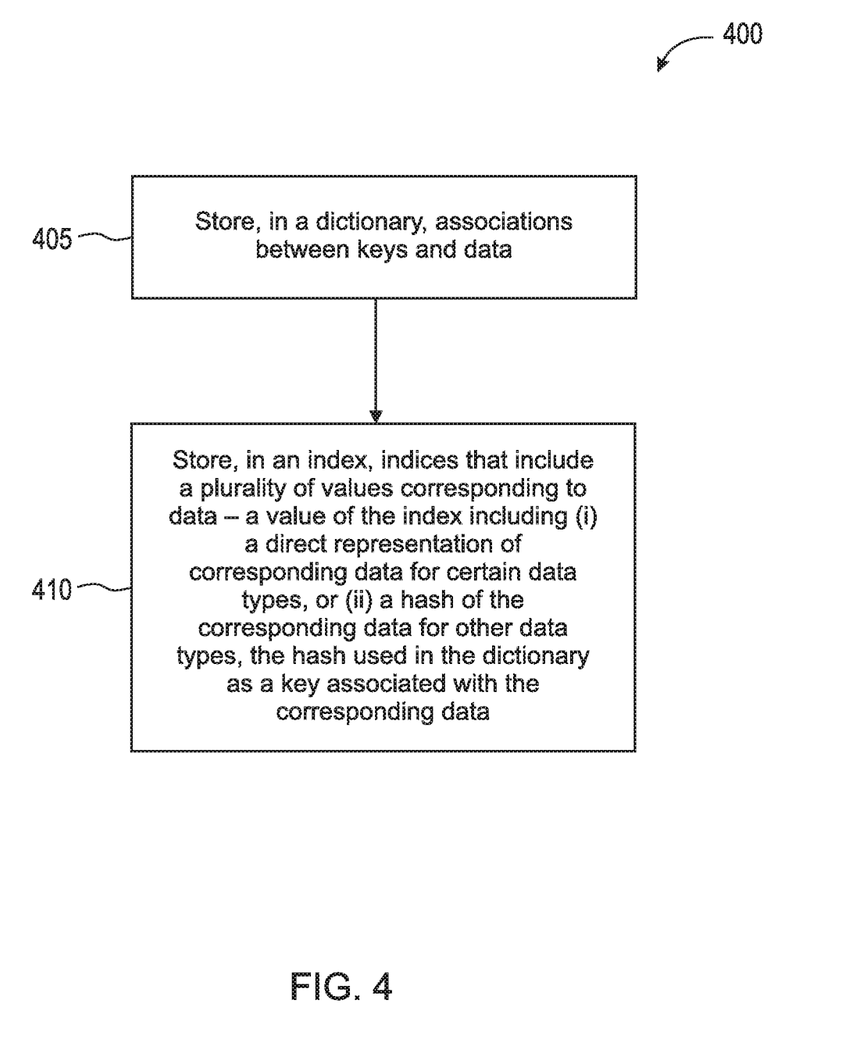
FIG. 4 is a flow diagram illustrating a computer implemented method of storing data in a database, according to an example embodiment.

FIG. 4 is a flow diagram illustrating a computer implemented method 400 of storing data in a database, according to an example embodiment. The example method includes storing 405, in a dictionary, associations between keys and data. The method further includes storing 410, in an index, indices including a plurality of values corresponding to data. A value of the index includes either (i) a direct representation of corresponding data for certain data types, or (ii) a hash of the corresponding data for other data types. The hash is used in the dictionary as a key associated with the corresponding data.

Figure 5:
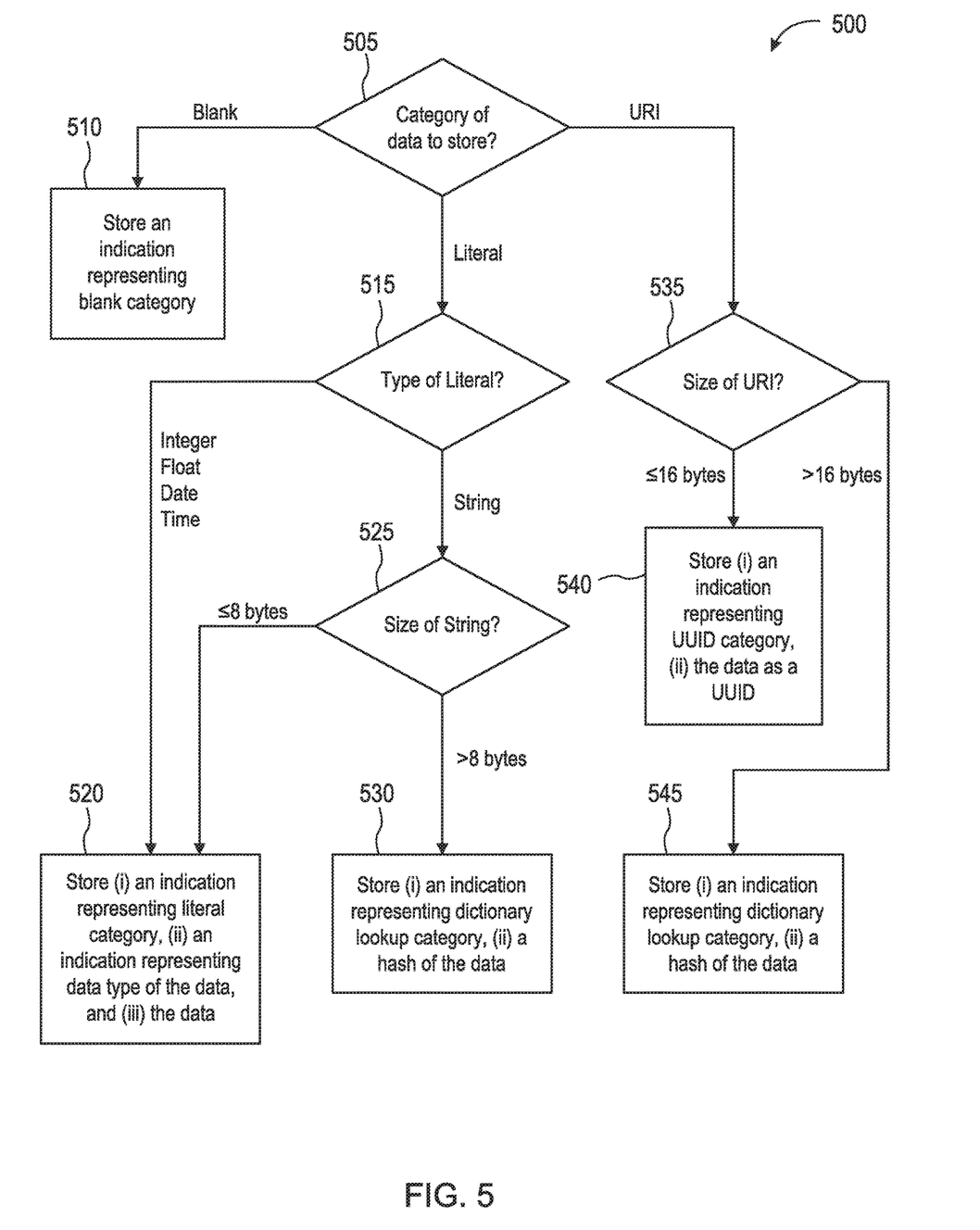
FIG. 5 is a flow diagram illustrating storing data in a database, according to an example embodiment.

FIG. 5 is a flow diagram illustrating a method 500 of storing data in a database, according to an example embodiment. A category of the data (e.g., URI) to be stored in the database is determined 505. If the category is "blank" (null node), then an indication that the data is blank can be stored 510 in an index value. If the category is "literal," then the type of literal is determined 515. If the literal data type is, for example, an integer, float, date, or time, then an indication that the data is a literal value can be stored 520 in an index value along with an indication of the data type and the literal value of the data. If the data type of the literal is a string, then the size of the string can be determined 525. If the size of the string is less than or equal to eight characters (64 bits), then an indication that the data is a literal value can be stored 520 in an index value along with an indication of the data type (string) and the literal value of the data. If the size of the string is greater than eight characters (64 bits), then an indication that the data is stored in the dictionary can be stored 530 in an index value along with a hash of the data; the hash used as a key in the dictionary.

If the category of the data is not blank or literal, then a size of the data can be determined 535. If the size of the data is less than or equal to sixteen bytes (128 bits), then the data may be represented as a UUID, and an indication that the data is represented as a UUID can be stored 540 in an index value along with the UUID. If the size of the data is greater than sixteen bytes (128 bits), then an indication that the data is stored in the dictionary can be stored 545 in an index value along with a hash of the data; the hash used as a key in the dictionary.

Figure 6:
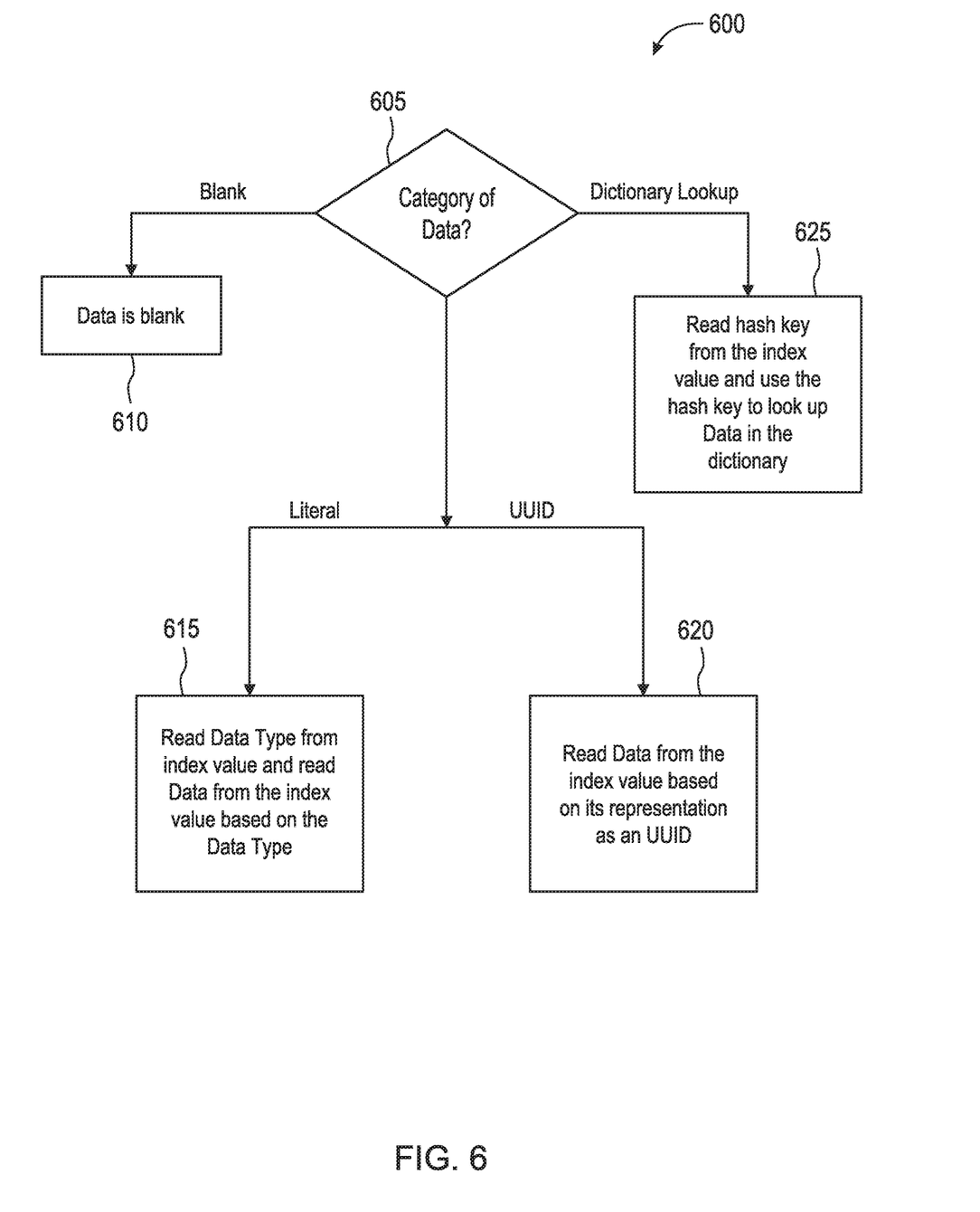
FIG. 6 is a flow diagram illustrating reading data from a database, according to an example embodiment.

FIG. 6 is a flow diagram illustrating a method 600 of reading data from a database, according to an example embodiment. A category of the data stored in an index value can be determined 605 (e.g., by interpreting two bits of the index value, as described above). If the category is "blank" (a null node), then the data is blank 610. If the category is literal, then the type of the data can be interpreted 615 from the index value (e.g., by interpreting 62 bits of the index value, as described above). Based on the data type, the data can be read 615 from the index value (e.g., from the remaining 64 bits) as a literal value. If the category is UUID, then the data can be read 620 from the index value based on the data's representation as a UUID. If the category is dictionary lookup, then a hash key can be read 625 from the index value and used to access the data in the dictionary.

Figure 7:
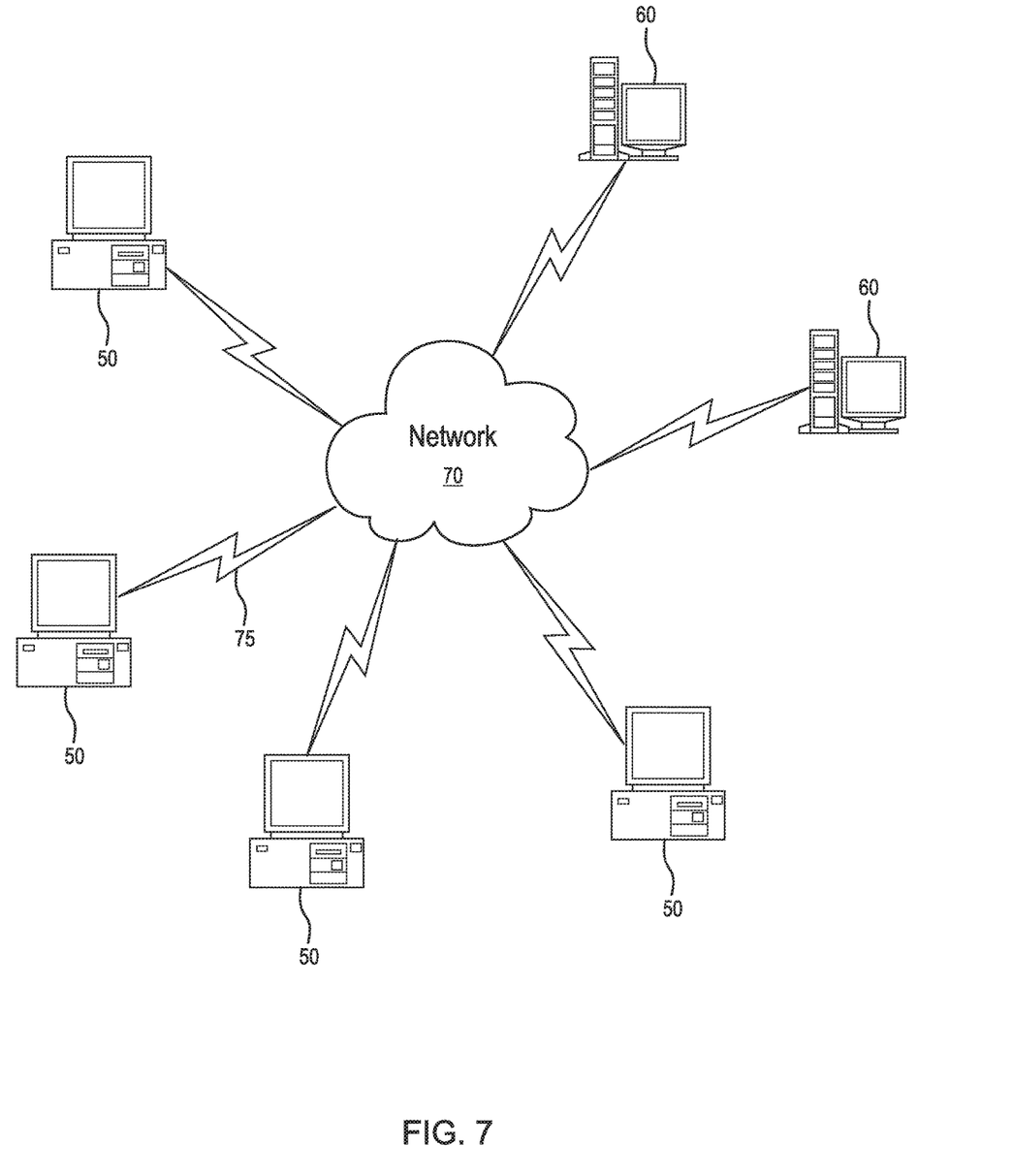
FIG. 7 is a schematic view of a computer network environment in which the example embodiments presented herein can be implemented.

FIG. 7 illustrates a computer network or similar digital processing environment in which the present embodiments may be implemented. Client computer(s)/devices/processors 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 8:
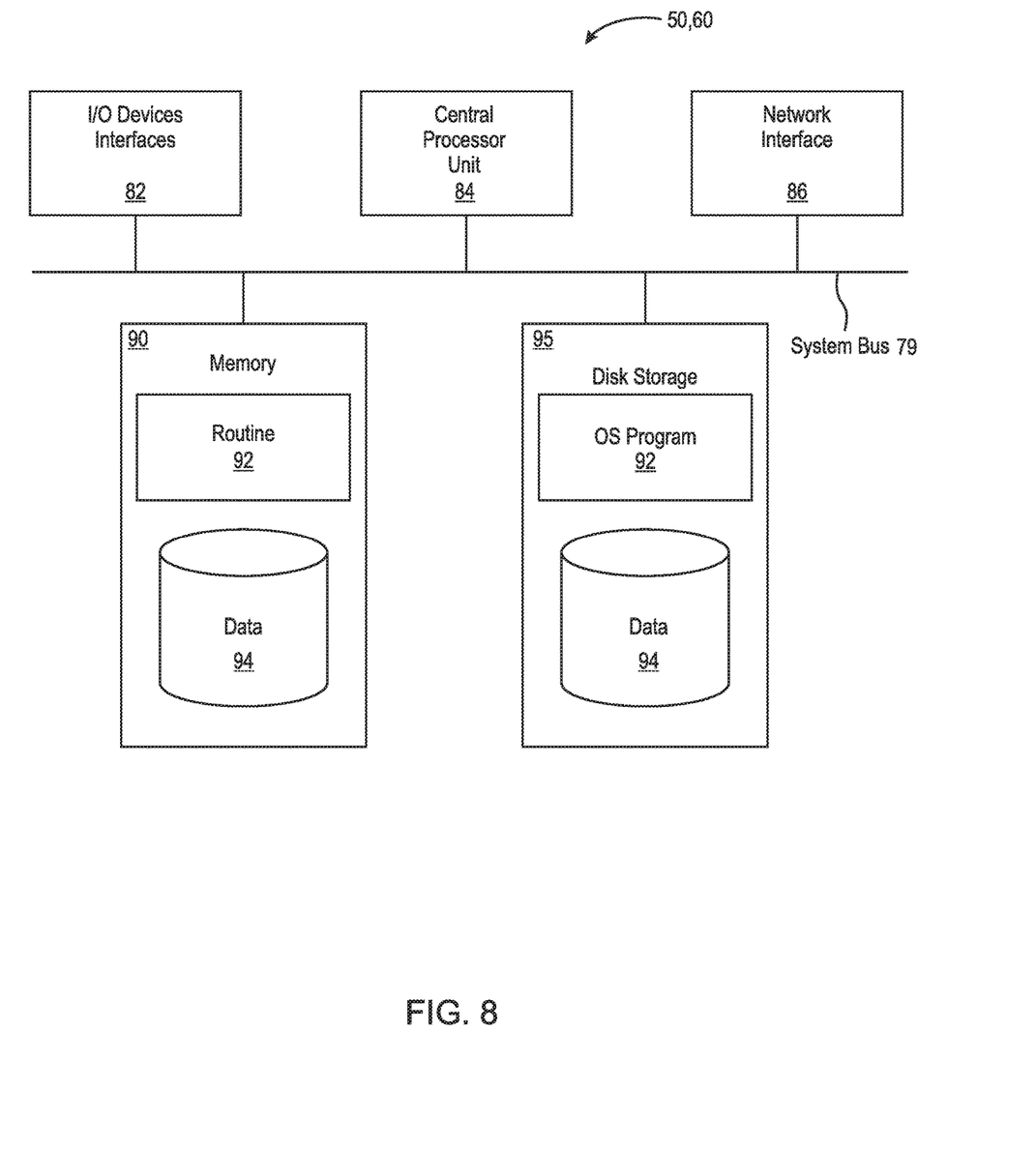
FIG. 8 is a block diagram illustrating an example computer node of the network of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, and network ports) that enables the transfer of information between the elements. Attached to system bus 79 is I/O device interface 82 for connecting various input and output devices (e.g., keyboard, mouse, displays, printers, and speakers) to the computer 50, 60. Network interface 86 allows the computer to connect to various other devices attached to a network (e.g., network 70 of FIG. 7). Memory 90 provides volatile storage for computer software instructions 92 and data 94 used to implement many embodiments (e.g., code detailed above and in FIGS. 3-6 including routines 300, 400, 500, and 600). Disk storage 95 provides non-volatile storage for computer software instructions 92 and data 94 used to implement many embodiments. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, and tapes) that provides at least a portion of the software instructions for the system. Computer program product 92 can be installed by any suitable software installation procedure, as is well known in the art. In another embodiment, at least a portion of the software instructions may also be downloaded over a cable, communication, and/or wireless connection. In other embodiments, the programs are a computer program propagated signal product 75 (FIG. 7) embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product. Generally speaking, the term "carrier medium" or transient carrier encompasses the foregoing transient signals, propagated signals, propagated medium, storage medium and the like. In other embodiments, the program product 92 may be implemented as a so-called Software as a Service (SaaS), or other installation or communication supporting end-users.

While example embodiments have been particularly shown and described, it will be understood by those skilled in the art that various changes in form and details may be made therein without departing from the scope of the embodiments encompassed by the appended claims.

What is claimed is:

1. A database implemented in computer memory using one or more processors, the database comprising:
 a dictionary in the computer memory and storing associations between keys and data; and
 an index stored in the computer memory, each entry in the index including a plurality of values corresponding to data;
 values in a given entry of the index each including a respective representation of corresponding data based on data type of the corresponding data wherein (i) a direct representation of the corresponding data is stored in the computer memory associated with the index when the data type of the corresponding data is one of certain data types, and (ii) a hash of the corresponding data is stored in the computer memory associated with the index when the data type of the corresponding data is one of other data types, the hash used in the dictionary as a key associated with the corresponding data to access the corresponding data in the dictionary;

a first number of bits of a given index value represent a category of data represented by the given index value wherein (i) the category of data represented by the first number of bits of the given index value is a literal value category, (ii) a second number of bits of the given index value represent a data type of the literal value, and (iii) remaining bits of the given index value store the literal value of the data, the remaining bits being bits of the index not belonging to the first number of bits or the second number of bits.

2. A database as in claim 1 wherein the database is a Resource Description Framework database and the plurality of values of the index include three values corresponding to a subject, a predicate, and an object.

3. A database as in claim 1 wherein a value of the index includes a direct representation of corresponding data for any of integer, double, float, string of eight characters or less, or universally unique identifier data types.

4. A database as in claim 1 wherein the given index value is 128 bits, the first number of bits is two bits, and the second number of bits is 62 bits.

5. A database as in claim 1 wherein a first number of bits of an index value represent a category of data represented by the index value and remaining bits of the index value store the data, the remaining bits being bits of the index not belonging to the first number of bits.

6. A database as in claim 5 wherein the data stored in the remaining bits of the index value is a universally unique identifier.

7. A database as in claim 1 wherein a first number of bits of an index value represent a category of data represented by the index value and remaining bits of the index value store a hash of the data, the remaining bits being bits of the index not belonging to the first number of bits.

8. A computer implemented method of storing data in a database implemented in computer memory, the database including an index and a dictionary stored in the computer memory, the method implemented by one or more processors and comprising:

storing, in the computer memory of the dictionary, associations between keys and data; and storing, in the computer memory of the index, indices including a plurality of values corresponding to data, wherein storing indices in the index includes (i) storing in a first number of bits of a given index value a representation of a category of data represented by the given index value where the category of data represented by the first number of bits of the given index value is a literal value category, (ii) storing in a second number of bits of the given index value a representation of a data type of the literal value, and (iii) storing the literal value of the data in remaining bits of the given index value, the remaining bits being bits of the index not belonging to the first number of bits or the second number of bits;

values in a given entry of the index each including a respective representation of corresponding data based on data type of the corresponding data wherein (i) a direct representation of the corresponding data is stored in the computer memory of the index when the data type of the corresponding data is one of certain data types, and (ii) a hash of the corresponding data is stored in the computer memory of the index when the data type of the corresponding data is one of other data types, the hash used in the dictionary as a key associated with the corresponding data to access the corresponding data in the dictionary.

9. A method as in claim 8 wherein the database is a Resource Description Framework database and the plurality of values of the index include three values corresponding to a subject, a predicate, and an object.

10. A method as in claim 8 wherein storing indices in the index includes storing, in the computer memory of the index, a value of the index as a direct representation of corresponding data for any of integer, double, float, string of eight characters or less, or universally unique identifier data types.

11. A method as in claim 8 wherein storing indices in the index includes (i) storing in a first number of bits of an index value a representation of a category of data represented by the value and (ii) storing the data in remaining bits of the index value, the remaining bits being bits of the index not belonging to the first number of bits.

12. A method as in claim 11 wherein storing indices in the index includes storing a universally unique identifier in the remaining bits of the index value.

13. A method as in claim 8 wherein storing indices in the index includes (i) storing in a first number of bits of an index value a representation of a category of data represented by the value and (ii) storing a hash of the data in remaining bits of the index value, the remaining bits being bits of the index not belonging to the first number of bits.

14. A method of storing and retrieving data in computer memory, the method implemented by one or more processors and comprising:

configuring the computer memory according to an index and a dictionary, each entry in the index including a plurality of values corresponding to data, and the dictionary storing, in the computer memory, associations between keys and data;

values in a given entry of the index each including a respective representation of corresponding data based on data type of the corresponding data wherein (i) a direct representation of the corresponding data is stored in the computer memory of the index when the data type of the corresponding data is one of certain data types, and (ii) a hash of the corresponding data is stored in the computer memory of the index when the data type of the corresponding data is one of other data types, the hash used in the dictionary as a key associated with the corresponding data to access the corresponding data in the dictionary;

a first number of bits of a given index value represent a category of data represented by the given index value wherein (i) the category of data represented by the first number of bits of the given index value is a literal value category, (ii) a second number of bits of the given index value represent a data type of the literal value, and (iii) remaining bits of the given index value store the literal value of the data, the remaining bits being bits of the index not belonging to the first number of bits or the second number of bits.

* * * * *